UNITED STATES PATENT OFFICE.

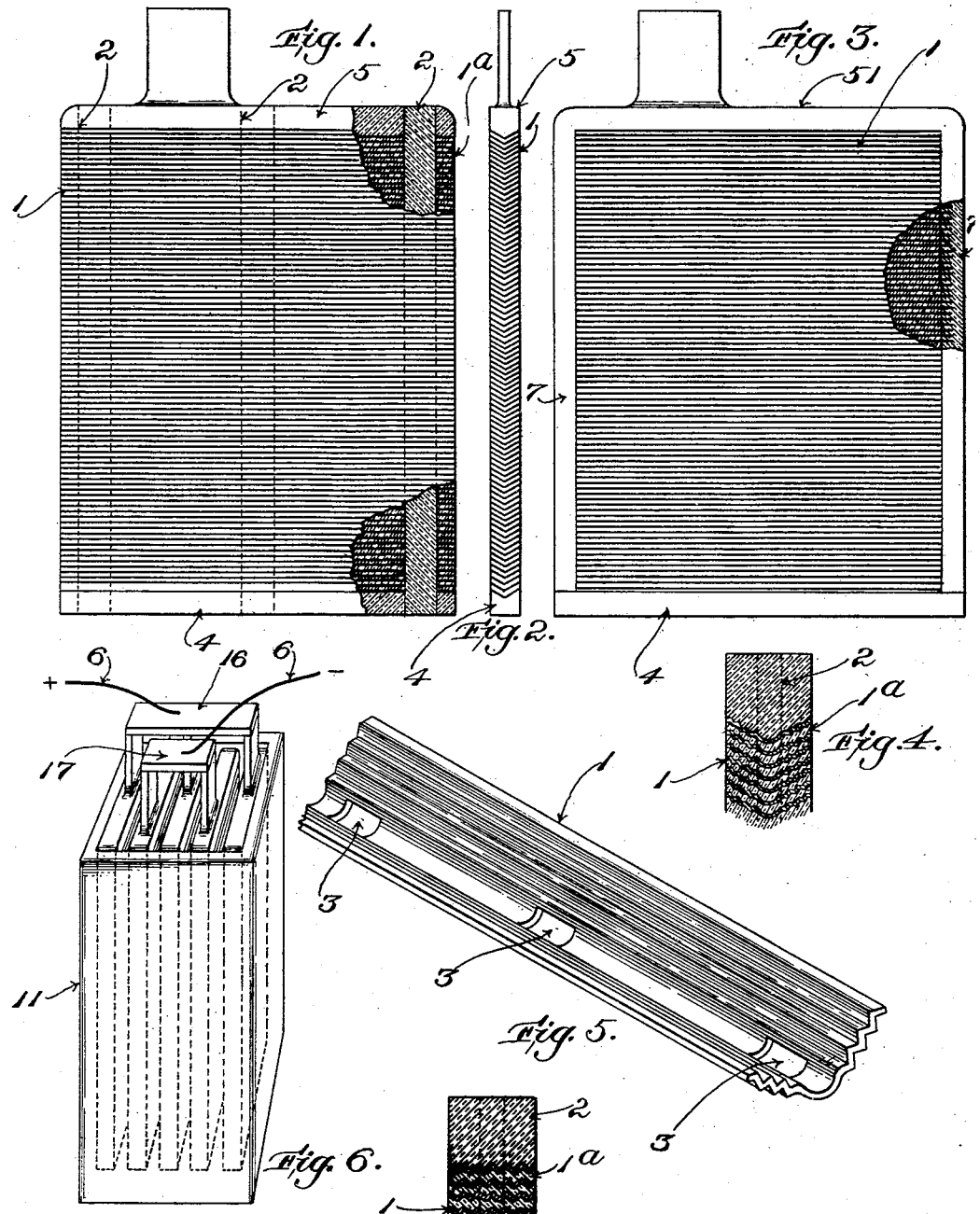

LEVI W. LOMBARD, OF BOSTON, MASSACHUSETTS.

STORAGE BATTERY.

SPECIFICATION forming part of Letters Patent No. 684,376, dated October 8, 1901.

Application filed November 15, 1900. Serial No. 36,597. (No model.)

*To all whom it may concern:*

Be it known that I, LEVI W. LOMBARD, a citizen of the United States, residing at Boston, in the county of Suffolk, State of Massachusetts, have invented a certain new and useful Improvement in Storage Batteries, of which the following is a specification, reference being had therein to the accompanying drawings.

My object is in general to provide for use in storage batteries a plate which shall present the largest possible amount of surface for the storage of electrical energy within the smallest possible space or compass and which shall be of the minimum weight consistent with proper storage capacity and strength; also, to produce a battery-plate that shall be strong and free from liability to warp by expansion and contraction in use; also, to produce a plate which can be cheaply manufactured, and also to produce a plate in which the active material shall be held in place efficiently and without tendency to become loosened or dislodged by the changes which are incident to charging and discharging.

The invention consists in a plate for use in storage batteries having the construction and characteristics which I will now proceed to explain with reference to the accompanying drawings, in which latter I have illustrated an embodiment of the invention.

In the drawings, Figure 1 shows in elevation, with small portions broken away, a storage-battery plate embodying the invention. Fig. 2 is an elevation of one end thereof. Fig. 3 is an elevation showing a different mode of constructing the plate. Fig. 4 is a view in vertical section, on an enlarged scale, showing certain features of the construction more clearly. Fig. 5 is a perspective, on a still further enlarged scale, of one of the strips. Fig. 6 is a perspective illustrating a battery in which are supposed to be employed plates embodying the invention. Fig. 7 is a vertical section illustrating another form of strip used in the construction of a battery-plate.

Having reference to the drawings, the main feature of my improved plate is a series of separate strips 1 1 of suitable material. Preferably these strips are composed of lead, and they are comparatively thin. They are united to form an assemblage in the shape, substantially, of the desired plate. They are formed with a plurality of fine longitudinal corrugations (see Figs. 4 and 5) for the purpose of holding the active material $1^a$ more effectively in place between the opposing faces of adjoining strips and for the purpose of giving a maximum extent of surface within a plate of given thickness. Preferably in order to maintain uniformity in the thickness of a strip, and thereby retain the full strength thereof, the corrugations are formed, as shown, with the ribs of the one face corresponding in position with the grooves of the other face. The strips may be flat, as represented in Fig. 7; but preferably they are formed of a substantially V-like trough shape, as shown in the other figures, especially in Figs. 4 and 5, and are employed in the plate with their concave faces uppermost, as represented. This keeps the active material $1^a$ from washing out from the intervening spaces between the strips as the electrolyte is set in motion by movements of the containing jar or receptacle 11, Fig. 6.

In the assembled series forming the plate the strips are set at a slight distance apart from one another to form thin spaces for the reception of the active material $1^a$. In the operation of preparing the plate for use the strips having been assembled and secured together in the required relations the active material is caused to occupy and fill the said spaces.

By forming the strips of a V-like trough shape, as above described, I am enabled to make them present individually a relatively large extent of surface, while keeping the plate in its entirety comparatively thin.

The strips may be united to form the plate in various ways. In Figs. 1 and 4 I have shown the strips strung close together upon a series of upright supporting-bars 2 2 2. The strips are formed with slots 3 3 3, Fig. 5, therethrough to receive the said bars. A foot-bar or bottom bar 4 is secured to the lower ends of the supporting-bars 2 2 2 below the series of strips 1 1, and a head-bar or top bar 5 is applied to the upper ends of the said supporting-bars 2 2 2 above the series of strips 1 1. A conducting-wire 6 will be connected to the head-bar or top bar 5 in any convenient manner in practice. In Fig. 6 I have represented alternate plates of a set (here shown for convenience as constituted of five plates) connected together by means of a horizontal strip 16, having one conducting-wire attached thereto, the intermediate plates being in similar manner connected together by a second strip 17, having the other conducting-wire attached thereto.

Fig. 3 shows the strips as having connected therewith a head-bar or top bar 51 and side bars 7 7, formed by casting lead upon the top and opposite ends of the assembled series of strips 1 1, the ends of the strips being embedded in the material of the said side bars, as shown. The lower ends of the side bars are "burned" to the ends of the bottom bar, thereby firmly uniting these parts to one another. The cast head-bar or top bar and side bars connected with the foot-bar, as described, unite the parts together into the form of the plate and at the same time hold the ends of the strips spaced at the desired distance apart from one another.

By forming the plate of an assembled series of strips separated by the spaces containing the active material such strips are enabled to give or move at and adjacent their outer edges without breakage of the strips or any other injury resulting to the plate, as the active material occupying such spaces expands and contracts during the charging of the plate or the use thereof.

I claim as my invention—

1. The improved plate for storage batteries, comprising, essentially, a series of separately-formed strips united together in the form of a plate, the said strips having a plurality of fine longitudinal corrugations as set forth, and the spaces between the strips being occupied by active material, the said corrugations operating to hold the active material in place and also give a maximum of surface, substantially as described.

2. The improved plate for storage batteries, comprising, essentially, a series of separately-formed trough-shaped strips united together in the form of a plate, the said strips having a plurality of fine longitudinal corrugations as set forth, and the spaces between the strips being occupied by active material, the said corrugations assisting to hold the active material in place and also give a maximum of surface, substantially as described.

In testimony whereof I affix my signature in presence of two witnesses.

LEVI W. LOMBARD.

Witnesses:
CHAS. F. RANDALL,
WILLIAM A. COPELAND.